Figure 1:
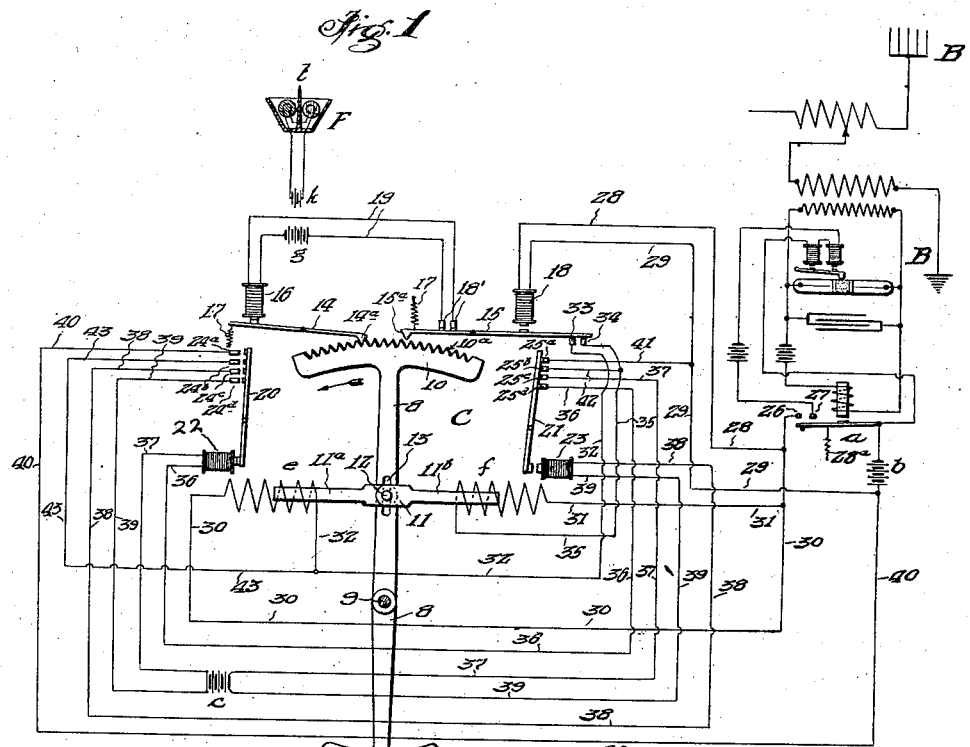

V. C. DE YBARRONDO.
WIRELESS TRANSMISSION APPARATUS FOR CONTROLLING THE MOVEMENTS OF VESSELS.
APPLICATION FILED JAN. 31, 1910.

970,592.

Patented Sept. 20, 1910.

Witnesses:
J. Mansfield
B. F. Fletcher

Inventor,
Vincent C. de Ybarrondo,
by
Becker & Blakeslee,
his attorneys.

UNITED STATES PATENT OFFICE.

VINCENT C. DE YBARRONDO, OF LOS ANGELES, CALIFORNIA.

WIRELESS TRANSMISSION APPARATUS FOR CONTROLLING THE MOVEMENTS OF VESSELS.

970,592.  Specification of Letters Patent.  Patented Sept. 20, 1910.

Application filed January 31, 1910. Serial No. 541,174.

*To all whom it may concern:*

Be it known that I, VINCENT C. DE YBARRONDO, a citizen of the United States, residing at Los Angeles, in the county of Los Angeles and State of California, have invented new and useful Improvements in Wireless Transmission Apparatus for Controlling the Movements of Vessels, of which the following is a specification.

This invention relates to wireless transmission apparatus for controlling movements of vessels, and more particularly for controlling movements of torpedoes; and has for its object to provide apparatus of the character described which will be relatively simple and inexpensive in construction and organization, positive in operation, and whereby with relative ease and accuracy the movement of a vessel or torpedo may be controlled by an operator through a relatively great distance.

According to the invention the vessel or torpedo is provided with electro-magnetic means combined with the rudder thereof, which electro-magnetic means are energized by impulses transmitted thereto from suitable generating apparatus under control of the operator. The electro-magnetic means utilize the impulses to produce movement of the propeller alternately in opposite directions or through a path of oscillation as predetermined.

The invention consists in the novel provision, construction, formation, combination, association and relative arrangement of parts, members, features and elements, all as hereinafter described, shown in the drawing and finally pointed out in claims.

Figure 2:
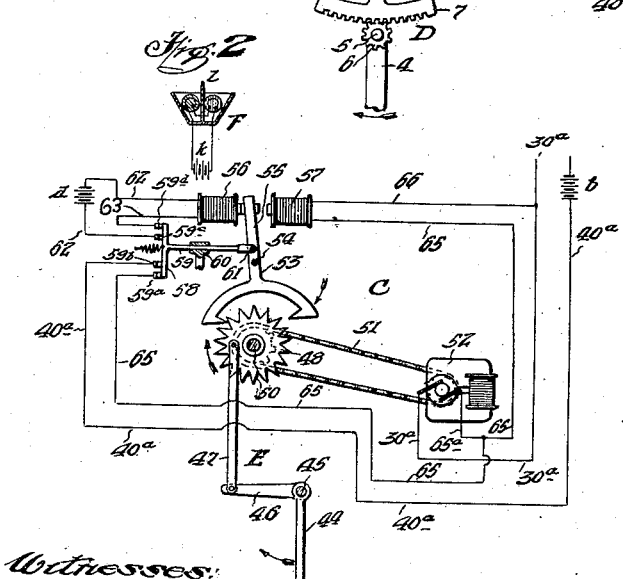

In the drawing:—Figure 1 is a plan view, partly diagrammatic and partly fragmentary, of wireless apparatus for controlling the movements of torpedoes and other vessels; and Fig. 2 is a view similar to Fig. 1 of a modified form of construction and organization.

The impulse-receiving apparatus shown in Fig. 1 is common to the systems and apparatus shown in both Figs. 1 and 2.

Corresponding parts in all the figures are denoted by the same reference characters.

Referring with particularity to the drawing, B designates impulse-receiving apparatus, and C designates electro-magnetic means combined with rudder mechanism D in Fig. 1 and rudder mechanism E in Fig. 2. The impulse-transmitting apparatus employed may be of any preferred suitable form or type, as may be the impulse-receiving apparatus B, the latter comprising a coherer, decoherer, condenser and resistance, in accordance with standard practice; and controlling the movements of a spring-resisted switch *a* which likewise controls the circuit through a battery or source of electrical supply *b*. A further battery or source of electrical supply *c* is installed in the circuits which include the electro-magnetic means C in Fig. 1. A similar battery or source of electrical supply *d* is installed in the circuits including the electro-magnetic means C in Fig. 2. The torpedo shown in Fig. 3 may be provided with lighting means F mounted upon the support for the impulse-receiving apparatus B, or otherwise, and including two lights of differentiated colors arranged to indicate the course taken by the torpedo.

Referring now to the form of construction and organization shown in Fig. 1, the rudder mechanism D may comprise a vertical rudder 4 mounted for pivotal movement upon a shaft 5 provided with a pinion 6 meshing with a sector head 7 mounted at one end of an intermediately fulcrumed arm 8 the fulcrum of which is indicated at 9. The other end of the arm 8 is provided with a sector head 10; and intermediately between the sector head 10 and the fulcrum 9 is provided a common armature 11 for two solenoids, *e* and *f* respectively, of which the solenoid *e* includes the armature 11$^a$ and the solenoid *f* includes the armature 11$^b$. The armature 11 is pivotally and slidably mounted upon the arm 8 by a pin 12 fixed to the armature and traversing the elongated slot 13 formed longitudinally of the arm 8.

Co-acting with the sector head 10 are intermediately pivoted latches, 14 and 15 respectively, having end teeth 14$^a$ and 15$^a$ arranged to engage with teeth 10$^a$ upon the sector head 10. An electro-magnet 16 is arranged to co-act with the latch 14 at the end thereof away from the sector head 10, which latter end is normally spring-retracted from the sector head by a spring 17. An electro-magnet 18 co-acts with the end of the latch 15 away from the sector head 10, acting against a spring 17 which normally holds the latch away from the sector head 10. The latch 15 furthermore acts as a switch to open or close a circuit through the electro-magnet 16 and a battery or source of electrical supply $g$, said latch 15 being arranged to contact with points 18' in circuit with the battery $g$ and electro-magnet 16 and circuit wires 19 connecting all of the same; such contact of such latch 15 and the points 18' being produced when the latch tooth 15$^a$ is away from the sector head 10. I further provide intermediately pivoted switches 20 and 21 one end of each of which is adapted to co-act with an electro-magnet, 22 and 23, respectively, the other end of each of which being adapted to co-act simultaneously with four switch points 24$^a$, 24$^b$, 24$^c$ and 24$^d$, and 25$^a$, 25$^b$, 25$^c$ and 25$^d$, respectively.

The switch $a$ co-acts with two points, 26 and 27, simultaneously, when actuated against its retracting spring 28$^a$, by the receiving apparatus B. From the point 26 a circuit wire 28 leads to the electro-magnet 18, when a circuit wire 29 leads to the battery $b$. The circuit wire 28 leads directly to a circuit wire 30 which is directly connected with the point 26, said circuit wire 30 leading to the solenoid $e$. From the circuit wire 30 a circuit wire 31 leads to the solenoid $f$. From the solenoid $e$ a circuit 32 leads to a point 33 adjacent to another point 34 both of which are controlled by the end of the latch 15 other than that provided by the tooth 15$^a$. From the point 34 a circuit 35 leads to the solenoid $f$. From the point 25$^d$ controlled by the switch 21 a circuit wire 36 extends to the electro-magnet 22, whence a circuit 37 extends to and through the battery $c$ and to the switch point 25$^c$. From the switch point 24$^c$ a circuit wire 38 extends to the electro-magnet 23, whence a circuit wire 39 extends through the battery $c$ to the switch point 24$^d$. From the switch point 24$^a$ a circuit 40 extends to the circuit wire 29 and thence to a circuit wire 41 leading to the switch point 25$^a$; and from the switch point 25$^b$ a circuit wire 42 leads to the circuit wire 35 which leads to the switch points 34. From the switch point 24$^b$ a circuit wire 43 extends to the circuit wire 32 which leads to the solenoid $e$.

Referring particularly to the construction shown in Fig. 2, the rudder mechanism E comprises a vertical rudder 44 pivotally mounted as at 45 upon a shaft provided with a crank arm 46 directed angularly from the rudder and pivotally connected by a link arm 47 with a star wheel 48 rotatably mounted upon a suitable shaft 50, the link arm 47 being pivotally connected with one face of the star wheel 48. Said wheel 48 is driven by operative connections 51, which may consist of a link belt leading to an electric motor 52. A detent 53, pivotally mounted as at 54, co-acts with the star wheel 48, being provided with an arm 55 which co-acts with and is arranged between electro-magnets 56 and 57. A reciprocating spring-seated switch head 58 is slidably mounted by an arm 59 which plays through a slotted head 60, said arm 59 being pivotally connected, as at 61, with the detent arm 53. The switch head 58 co-acts with switch points 59$^a$, 59$^b$, 59$^c$ and 59$^d$, simultaneously. From the electro-magnet 56 a circuit wire 62 extends through the battery $d$ to the switch 59$^c$. A circuit wire 63 extends from the switch point 59$^d$ to the electro-magnet 56. From the switch point 59$^b$ a circuit wire 40$^a$ extends to the battery $b$. From the switch point 59$^a$ a circuit wire 65 extends to the electro-magnet 57, said circuit wire 65 having a branch 65$^a$ extending to one pole of the motor 52. From the electro-magnet 57 a circuit wire 30$^a$ extends to the other pole of the motor 52. The circuit wires 30$^a$ and 40$^a$ correspond to the circuit wires 30 and 40 in the organization shown in Fig. 1, the former supplying to the electro-magnetic means C the impulses received by the apparatus B.

The lighting means F are adapted to be electrically operated, as indicated, preferably upon a separate circuit, the same being provided with a battery or electricity supply circuit $k$, and the two lights being separated by an opaque disk or partition $l$.

The operation, method of use and advantages of the improved wireless apparatus for controlling the movements of vessels constituting the invention will be readily understood from the foregoing description, taken in connection with the accompanying drawing and the following statement:—

Referring with particularity to the organization shown in Fig. 1, with the parts in the position shown, an electrical impulse received by the apparatus B will cause the switch $a$ to close upon the points 26 and 27, followed by energization of the solenoids $e$ through the circuit wire 30. Immediately the electro-magnet 18 is energized through the circuit wires 28 and 29, lowering the latch 15 at the toothed end thereof, and establishing an open circuit through the battery $g$ and the electro-magnet 16, which causes the spring 17 to elevate the tooth 14$^a$ upon the latch 14, freeing the arm 8 so that the same may be drawn in the direction indicated by the arrow beneath the sector head 10, under the magnetic action of the solenoid $e$. As this movement takes place the tooth 15$^a$ upon the latch 15 drops into engagement with one of the teeth 10$^a$ upon the sector head 10 locking the sector head and arm 8 after slight movement thereof, which movement causes oscillation of the rudder 4 through the toothed sector head 7 and the pinion 6. As soon as the sending key of the transmitting apparatus A is released, the parts will all be restored to positions shown in Fig. 1, with the exception of the rudder 4 which will be held in its position of adjustment as last described by the tooth 14$^a$ which will drop into engagement with one of the teeth 10$^a$ of the sector head 10, as the tooth 15$^a$ rises from said toothed sector head. Depression of the sending key of the transmitting apparatus will cause a repetition of the steps above described, the rudder being moved successively in the same direction, as denoted by the arrow adjacent to it, until the sector head 10 comes into engagement with the switch 20. When the sector head 10 so strikes the switch 20, it causes said switch to close the circuit through the switch points 24$^c$ and 24$^d$ and the battery $c$, energizing the electro-magnet 23 which withdraws the switch 21 from the switch points 25$^a$, 25$^b$, 25$^c$ and 25$^d$. This deenergizes the electro-magnet 22, by breaking the circuit through the wires 36 and 37 and the battery $c$, leaving the switch in connection with the contact point 24$^a$, 24$^b$, 24$^c$ and 24$^d$ disconnected. A circuit is also opened through the solenoid $e$ and the circuit wires 30, switch $a$, battery $b$, circuit wire 29, circuit wire 41, points 25$^a$ and 25$^b$, circuit wire 42, points 33 and 34, and circuit wire 32. The circuit is closed through the solenoid $f$, the circuit wire 35, the points 33 and 34, the circuit wire 32, the circuit wire 43, the points 24$^b$ and 24$^a$, the circuit wire 40, the battery $b$, the switch $a$, the circuit wire 30 and the circuit wire 31. In including the switch $a$ above in closed circuits, the engagement of the switch with the points 26 and 27, upon energization of the apparatus B, is assumed. With the parts in the positions last recited, energization of the apparatus B will cause the sector head 10 to be moved in the direction opposite to that indicated by the arrow adjacent thereto, the latches 14 and 15 operating in the manner above recited, and alternately acting to lock the sector head 10 in its step-by-step movement, which is accompanied by movement of the rudder in the direction opposite to that indicated by the adjacent arrow. This sequence of operations takes place until the sector head 10 strikes the switch 21, when all of the parts will be restored to the positions shown in Fig. 1, through the circuit wires described and leading from part to part as set forth, the solenoid $f$ being deënergized and the solenoid $e$ energized, the electro-magnet 23 being deënergized and the electro-magnet 22 being energized.

Referring to the organization shown in Fig. 2, with the parts shown in the drawing, when an electrical impulse is caused to energize the circuit wires 30$^a$ and 40$^a$, the electric motor 52 is energized through the circuit wires 40$^a$, the switch point 59$^b$, the switch point 59$^a$, the circuit wire 65, and the circuit wire 30$^a$. At the same time, as said motor is moving the star wheel 48 in the direction indicated by the adjacent arrow, the electro-magnet 57 is energized, moving the detent 53 in the direction indicated by the arrow until it checks the star wheel, after the rudder has moved a slight distance in the direction indicated by the adjacent arrow; and the arm 55 of the detent acting upon the arm 59 of the switch head 58 opens the circuit through the switch points 59$^a$ and 59$^b$ and the electric motor 52 and circuit wires 30$^a$ and 40$^a$ above described. As soon as the operator's finger is taken off from the key of the transmitting apparatus, the electro-magnet 57 is deënergized, and the spring of the switch head 58 again seats the switch head upon the switch points 59$^a$, 59$^b$, 59$^c$ and 59$^d$, energizing the electro-magnet 56 which holds the detent arm 55 in the position shown in the drawing, said electro-magnet 56 having been deënergized when the stronger electro-magnet 57 was energized to draw over to it the detent arm 55. The parts are all now in the first position above described, excepting that the star wheel 48 has moved one or more steps in the direction indicated by the arrow, into a position in which it is held by one member of the detent 53 as shown in the drawing. When the key of the transmission apparatus is again depressed, the succession of steps first described again takes place, rotating the star wheel 48 a little farther in the same direction and a succession of such operations causes movement of the rudder as the star wheel 48 rotates, the rotation being produced by alternate depressions and elevations of the sending key of the transmission instrument, or by the successive transmission of impulses to the apparatus B.

It will be manifest from the above statement that in both forms of construction and organization shown the rudder D or E may be intermittently moved, first in one direction and then in the other, to direct the course of the torpedo or other vessel, all under control of the operator of the impulse-transmitting mechanism. The lighting means F assist the operator in determining the course of the torpedo or other vessel, both lights appearing or one or the other being blinded by the partition or disk $l$.

I do not desire to be understood as limiting myself to the specific provision, operation, combination, organization, association and relative arrangement of parts, members and features shown and described; but reserve the right to vary the same, in adapting the improvements to varying conditions of use without departing from the spirit of the invention or the terms of the following claims.

Having thus described my invention, I claim and desire to secure by Letters Patent:—

1. The combination, with vessel steering mechanism; of electro-magnetic means controlling and actuating said steering mechanism, a latch acting to lock said steering mechanism in successive phases of movement, electro-magnetic means controlling said latch, and electrical impulse-receiving apparatus electrically connected with both of said electro-magnetic means.

2. The combination, with vessel steering mechanism; of electro-magnetic means controlling said steering mechanism and comprising two solenoids, two latches acting alternately to lock said steering mechanism in successive phases of movement, separate electro-magnetic means controlling each of said latches, and electrical impulse-receiving apparatus electrically connected with one of said electro-magnetic means controlling one of said latches and adapted for electrical connection with either of said solenoids.

3. The combination, with vessel steering mechanism; of two solenoids for controlling said steering mechanism, two switches controlling energization of said solenoids, two electro-magnets controlling said switches, said switches also controlling said electro-magnets each the electro-magnet of the other, and electrical impulse-receiving apparatus adapted for electrical connection with either of said solenoids.

4. The combination, with vessel steering mechanism; of electro-magnetic means controlling said steering mechanism; said electro-magnetic means comprising members non-simultaneously acting upon said steering mechanism, locking means for maintaining said steering mechanism in successive positions of movement, said locking means controlling energization of both of said members controlling said steering mechanism, and electrical impulse-receiving apparatus adapted for electrical connection with either of said latter members.

In testimony whereof, I have signed my name to this specification in the presence of two subscribing witnesses.

VINCENT C. DE YBARRONDO.

Witnesses:
 FRED A. MANSFIELD,
 B. F. FLETCHER.